United States Patent [19]

Carr

[11] 4,177,173

[45] Dec. 4, 1979

[54] POLYEPOXIDE CURING BY POLYMERCAPTANS CATALYZED BY DIMETHYLAMINO ALKYL ETHERS

[75] Inventor: Brian J. Carr, Fairfax, Calif.

[73] Assignee: Diamond Shamrock Corporation, Cleveland, Ohio

[21] Appl. No.: 971,434

[22] Filed: Dec. 20, 1978

[51] Int. Cl.$^2$ .................. C08G 59/66; C08G 59/68
[52] U.S. Cl. .................. 260/18 EP; 252/182; 528/89; 528/90; 528/107; 528/109; 528/361; 528/374; 525/507
[58] Field of Search .................. 528/89, 93, 90, 107, 528/109, 135, 361, 374; 260/18 EP; 252/182

[56] References Cited

U.S. PATENT DOCUMENTS

| | | | |
|---|---|---|---|
| 2,941,967 | 6/1960 | Möller et al. | 260/2.5 |
| 3,297,635 | 1/1967 | Bergman et al. | 260/47 |
| 3,310,527 | 3/1967 | De Acetis et al. | 260/47 |
| 3,330,782 | 7/1967 | Poppelsdorf | 260/2.5 |
| 3,363,026 | 1/1968 | Schroll | 260/831 |
| 3,472,913 | 10/1969 | Ephraim | 260/830 |
| 3,505,166 | 4/1970 | Jones et al. | 161/186 |
| 3,694,510 | 9/1972 | Moller et al. | 260/584 C |

*Primary Examiner*—Earl A. Nielsen
*Attorney, Agent, or Firm*—Neal T. Levin

[57] ABSTRACT

More rapid curing of polyepoxide resins is achieved by use of a curing system composed of at least one polymercaptan, at least one catalyst which is a poly[(N,N-dimethylamino)alkyl]ether and/or organic non-quaternized salts thereof derived from organic compounds having at least one acidic group and having a pKa greater than about 3.5 and, optionally, organic sulfide, tertiary phosphine or a tertiary amine having no bridged atoms, having no ether oxygen and having at least one tertiary amine group.

36 Claims, No Drawings

POLYEPOXIDE CURING BY POLYMERCAPTANS CATALYZED BY DIMETHYLAMINO ALKYL ETHERS

BACKGROUND OF THE INVENTION

1. Field of the Invention

This invention relates to curing of polyepoxide resins to produce hard, insoluble, infusible films, castings and adhesives.

2. Description of the Prior Art

Polyglycidyl ethers, particularly those prepared from a dihydric phenol such as Bisphenol A, i.e., 2,2-bis(4-hydroxyphenyl) propane, and an epihalohydrin such as epichlorohydrin, also referred to as epoxy resins, epoxide resins, polyepoxide resins or polyepoxides, have become increasingly important commercially in recent years. When cured, these thermosetting resins form insoluble, infusible films, pottings, castings, adhesives, and the like, and are markedly superior in their physical, chemical, and electrical properties to many other cured thermosetting resins. They exhibit low shrinkage during curing. The combination of hardness and toughness exhibited by the cured resins, their high adhesive strength, resistance to degradation by solvents and other chemicals and their electrical properties, such as dielectric constant and resistivity, are outstanding. At the same time, these properties can be varied within wide limits depending on the end use intended for the resin. Of the wide variety of hardeners, curing agents, or homopolymerization catalysts which have been used to cure polyepoxide resins, no one is suitable for all applications, and many have serious drawbacks no matter what the application.

Carboxylic acids and anhydrides are used as curing agents. However, polyepoxide compositions containing them must be cured at elevated temperatures for some time.

Polyphenols are also employed as curing agents for polyepoxide resins, albeit, somewhat less extensively, as they require relatively high temperatures for effective cures.

Catalysts, both Lewis acids and Lewis bases may be used to cure epoxy resins by homopolymerization. Lewis acids used commercially are typically complexes of boron trifluoride and the like. Types of complexes that cure at room temperature, for example, boron trifluoride/glycols, while rapid, are poisoned by atmospheric or surface water, alkaline fillers and alkaline substrates, for example, Portland Cement construction on which they are placed. Lewis bases, typically tertiary amines and tertiary amine salts, onium bases, tertiary phosphines and certain organic sulfides require an elevated temperature to complete cure.

Primary and secondary polyamines of various types are frequently employed as curing agents for polyepoxide resins, but the results obtained vary depending on a number of factors, such as the particular amine, the polyepoxide resin employed, the curing temperature, and so on.

Many amines fail to give satisfactory results over a wide range of curing conditions. Unmodified cycloaliphatic and aromatic polyamines require a high temperature, for example, 125°–200° C., to bring about full cure. These same types when modified with certain materials such as plasticizers and flexibilizers and acidic accelerators will cure at room temperature, but the cure rate becomes extremely slow or non-existent at temperatures less than 5° C. and especially less than 0° C.

The most widely used types of curing agents for epoxy resins at room temperature are aliphatic primary and secondary polyamines used as such or modified, for example, to produce the so called amidoamines and reactive polyamide resins. Curing times necessary when using certain aliphatic amines are often longer than desirable or practical, while with other more reactive accelerated aliphatic polyamines the formulated composition has limited usable pot life even at room temperature. The amine/epoxy cure rate is temperature dependent. Most aliphatic amines will cure epoxy resins at room temperature (25° C.), and some even as low as 5° C. The cure rate at lower temperatures; however, is often too long to be practical. Below 5° C. the cure rate of activated aliphatic polyamines is decreased to the point of unworkability.

Polymercaptans are employed to cure polyepoxides. They are less dependent upon temperature and mass for their cure rates. Most polymercaptan hardener systems are designed to produce rapid thin film cures even at low temperatures (less than 0° C.). Useful cures can be achieved even as low as −18° C. It is further desirable to have the thin film set time and the large mass usable life (pot life) as close as possible. This indicates relative non-dependence on exothermic and ambient temperature for cure, and provides a more consistent cure time which is less dependent on ambient conditions. However, to obtain fast cure rates with polyepoxides, polymercaptans must be compounded with a catalyst. Tertiary amines such as 2,4,6-tri (dimethylaminomethyl) phenol, benzyl dimethylamine, and dimethylaminomethyl phenol are commonly used.

A number of tertiary amines have been described as catalysts for the mercaptan epoxy reaction. These include dimethylaminomethyl phenol. See U.S. Pat. No. 2,789,958—Fettes et al—Apr. 23, 1957, Examples 2,3,4,5 and 5A. 2,4,6-tri (dimethylaminomethyl) phenol is shown in U.S. Pat. No. 3,090,793—Casement et al—May 21, 1963. See Examples 2 through 5, 7 through 10, 12 and 13. Example 11 describes a tertiary phosphine in combination with the tertiary amine.

Use of 2,4,6-tri (dimethylaminomethyl) phenol or benzyl dimethylamine is shown in U.S. Pat. No. 3,297,635—Bergman et al—Jan. 10, 1967, (all examples). 2,4,6-tri (dimethylaminomethyl) phenol, dimethylaminomethyl phenol, dicyandiamide and pyridine are shown in all examples of U.S. Pat. No. 3,310,527—DeAcetis et al—Mar. 21, 1967, except Examples 4,6 and 7 where thioethers are catalysts, e.g., dibutyl sulfide and dioctyl sulfide. Example 6 also describes a tertiary phosphine, triphenyl phosphine, and a quaternary ammonium compound, benzyl trimethylammonium chloride, as catalysts.

Benzyl dimethylamine, dimethylaminomethyl phenol, triethanolamine and 2,4,6-tri (dimethylaminomethyl) phenol are shown as catalysts in Examples 2 through 7,9,11 and 12 in U.S. Pat. No. 3,355,512—DeAcetis et al—Nov. 28, 1967. Benzyl dimethylamine is shown in all examples in U.S. Pat. No. 3,369,040—DeAcetis et al—Feb. 13, 1968.

Benzyl dimethylamine (Examples 1 through 9), certain tertiary phosphines including triphenyl phosphine, tricyclohexyl phosphine and triamyl phosphine (Example 9) and certain quaternary ammonium compounds including benzyl trimethylammonium chloride, phenyl tributylammonium chloride and benzyl trimethylammonium borate (Example 11) are shown in U.S. Pat. No. 3,411,940—Lopez et al—Nov. 19, 1968. In U.S. Pat. No. 3,448,112—DeAcetis et al—June 3, 1969, is disclosed 2,4,6-tri (dimethylaminoemethyl) phenol (Examples 1 and 2), dimethylaminomethyl phenol (Example 3) and a thioether, dibutyl sulfide (Examples 4 and 7). Also pyridine and a thioether, dioctyl sulfide, a tertiary phosphine, triphenyl phosphine and a quaternary ammonium compound, benzyl trimethylammonium chloride, are shown in Example 6. Triethylenediamine is shown in Examples 9 and 10 and N,N,N',N'-tetramethylbutylenediamine is shown in Example 12 of U.S. Pat. No. 3,472,913—Ephraim et al—Oct. 14, 1969. U.S. Pat. No. 3,505,166—Jones et al—Apr. 7, 1970, shows the use of 2,4,6-tri (dimethylaminomethyl) phenol in Example 2.

Regarding present commercial practices using tertiary amines, 2,4,6-tri (dimethylaminomethyl) phenol is the most widely employed catalyst, while N,N,N',N'-tetramethylbutylenediamine, dimethylaminomethyl phenol and benzyl dimethylamine are also used.

The above patents claim for the most part novel polymercaptans as curing agents for epoxy resins and exemplify their utility using the well-known tertiary amine catalysts.

U.S. Pat. No. 3,291,776—Newey et al—Dec. 13, 1966, describes an unusual class of catalyst for the epoxy/mercaptan reaction, namely, the class of organic sulfides of the formula R—S—R where R is an aliphatic, alicyclic or aromatic radical having no more than 25 carbon atoms such as 2,2-thiodiethanol, dibutyl sulfide, 3,3-thiodipropanol and N-propylphenol sulfide. This class of catalyst has not achieved significant commercial acceptance due to the relatively slow catalytic action compared to tertiary amines.

U.S. Pat. No. 3,363,026—Schroll—Jan. 9, 1968, describes another unusual class of catalysts for the epoxy/mercaptan reaction comprising bicyclic, fused ring amines containing only carbon, hydrogen and nitrogen and having a nitrogen atom in at least one of the bridgehead positions, the nitrogen being connected to three different saturated carbon atoms and bearing an unshared pair of electrons, such as triethylenediamine and quinuclidine. However, this class exemplified by the preferred triethylenediamine possesses certain disadvantages as mercaptan/epoxy catalysts. It is a crystalline solid having a tendency to sublime even at room temperature and absorb moisture. Hence, its incorporation into a mercaptan hardener must be done under controlled conditions and temperatures. Further, containers of this mixture must be well sealed to prevent loss of reactivity due to catalyst volatilization and to prevent excessive absorption of moisture from the atmosphere. Further, while catalyzing the mercaptan/epoxy reaction, triethylenediamine appears to lose effectiveness. That is, while this catalyst as well as other fused ring catalysts promote a very rapid initial reaction, soon after and well before all epoxy and mercaptan groups are consumed, the reaction rate drops dramatically. Thus, the amine becomes bound up in the forming epoxy/mercaptan matrix through some form of complex formation characteristic of this class of tertiary amines. This deactivation effect can be demonstrated on a thin casting of an epoxy system containing a mercaptan accelerated with catalyst by measuring Barcol hardness as a function of time. When doing this, a plateau (hardness development stagnation) is reached quite early in the reaction process. Hardness development is taken as a representation of the degree of cure. Hardness then increases at a much slower rate to the final ultimate hardness or fully cured state.

Japanese Provisional Patent Publication (Japan Kokai) No. 17299/1976 [26 (5) K211] Feb. 12, 1976 to Miura, describes use of diazabicycloalkenes such as DBU (1,8-diazabicyclo (5,4,0) undecene-7) and its salts for reaction with epoxy resins. While this group of new catalysts is less volatile than the Schroll group, for example, triethylenediamine, it suffers from the disadvantage of reacting with moisture or water even at room temperature to form new compounds (primary amines) which present practical compounding and storage difficulties. Also, it exhibits significant toxic health hazards to humans.

With regard to the tertiary phosphines used by Casement et al and DeAcetis et al to catalyze the reaction of their novel mercaptans with polyepoxides, it is noted that this class of catalysts has not achieved commercial significance due to its relatively slow cure rate compared to the corresponding tertiary amines. In many cases members of this class also possess significantly higher toxicity relative to the tertiary amines.

"Onium" bases defined as highly ionized compounds containing ammonium, phosphonium, arsonium, stibonium, sulfonium, iodonium and thallonium cations may be divided into two types for the purpose of catalyzing the epoxy/mercaptan reaction; (1) those that are extremely slow in catalyzing the reaction, typically bases with inorganic anions excepting hydroxyl such as benzyl trimethylammonium chloride, phenyl tributylammonium chloride, benzyl trimethylammonium sulfate and benzyl trimethylammonium borate exemplified by DeAcetis et al and Lopez et al referred to above, the slow rate probably due to lack of solubility in in the epoxy/mercaptan media which does not normally contain water; and (2) those that are extremely fast in catalyzing the reaction; typically oil soluble onium bases such as the quaternary ammonium commpounds with hydroxyl or organic substituted anions such as the tetra alkyl ammonium hydroxides, alkoxides and phenoxides; benzyl trialkyl ammonium hydroxides, alkoxides and phenoxides and materials such as choline base and the like. All such "onium" bases that provide rapid catalysis of the epoxy mercaptan reaction are believed to do so by the general base catalysis mechanism described by Tanaka and Mika in "Epoxy Resins" edited by May and Tanaka and published by Marcel Dekker, 1973. See page 164 reactions 26 and 27. These catalysts apparently generate the active ionic species (the mercaptide ion) when the "onium" base and mercaptan are mixed and stored in the absence of epoxy resin, thus bringing about rapid gelation of the mercaptan on storage. Such gels have little value and three component systems whereby the epoxy resin, mercaptan and catalyst must be stored separately present extreme handling difficulties for the user. Active "onium" bases as catalysts for the epoxy/mercaptan reaction have not achieved commercial acceptance.

SUMMARY OF THE INVENTION

The combination of at least one polymercaptan and at least one catalyst of the class of poly [(N,N-dimethylamino) alkyl] ethers provides a rapid, effective curing system for curing one or more polyepoxide resins to form insoluble, infusible films, pottings, adhesives and castings and the like. This system overcomes many of the difficulties associated with known curing catalysts for the epoxy/mercaptan reaction and also of the other classes of polyepoxide curing agents described above.

Specifically, this class of catalysts in combination with polymercaptan provides a very rapid cure rate relative to the previously known tertiary amines, organic sulfides and tertiary phosphines. The cure rate is uninterrupted and proceeds to completion unlike the saturated fused ring amines such as triethylenediamine. Unlike the diazabicycloalkenes such as DBU, this class does not react with moisture and is less of a health hazard and unlike DBU and triethylenediamine, provides non-volatilizing stable compositions with mercaptans even on warm storage. Unlike the "onium" bases active as catalysts for the epoxy mercaptan reaction, this group does not cause gelation of the mercaptan when stored as a mixture in the absence of epoxy resin.

There is used from about 0.1 to about 1.5 equivalents of at least one polymercaptan per epoxide equivalent, from about 0.1 to about 20.0 parts by weight of at least one catalyst of the class of poly [(N,N-dimethylamino) alkyl] ether per 100 parts by weight of polyepoxide and from 0 to about 20.0 parts by weight per 100 parts by weight of polyepoxide of at least one organic sulfide, tertiary phosphine or tertiary amine having no bridged atoms in the structure, having no ether oxygen and having at least one tertiary amine substituent.

The curing system (polymercaptan and catalyst), also referred to as the curing agent or hardener component, is formulated by simple mixing of the polymercaptan and catalyst. Other modifiers, i.e., fillers, plasticizers, diluents, solvents, etc., can be added to produce systems with varying physical properties. Thereafter, the curing system is added to the polyepoxide by simple hand or mechanical mixing until all components are thoroughly blended. Depending upon the end use and the method of application, the curing system and polyepoxide can be pre-heated to lower viscosity or to attain faster gel times, or pre-cooled, as when ambient temperatures are low and heating the components is unworkable. Pre-cooling also permits casting larger masses where exothermic build-up is a problem.

Depending upon the end use, the thus activated polyepoxide is then cast into molds, applied by hand or machine, sprayed or flowed onto the substrate or substrates to be bonded, coated, laminated, encapsulated or the like.

DESCRIPTION OF THE PREFERRED EMBODIMENT

Polyepoxide

Concerning the nature of the polyepoxides, these are well-known materials and the curing of same described herein is not limited to any particular polyepoxide. It is only necessary that there be more than one vicinal 1,2-epoxide group per molecule in the polyepoxide. The polyepoxide may be saturated or unsaturated, aliphatic, cycloaliphatic, aromatic or heterocyclic and may be substituted with substituents, such as chlorine, hydroxy groups, ether groups and the like. It may be monomeric or polymeric. Many polyepoxides, particularly those of the polymeric type are described in terms of their epoxy equivalent. An explanation of same appears in U.S. Pat. No. 2,633,458—Shokal—Mar. 31, 1953, (see column 3, lines 3–34). The polyepoxides used herein are those having an epoxy functionality greater than 1.0, that is to say, that the number of epoxy groups per molecule, according to the expression, functionality is equal to molecular weight divided by epoxide equivalent, is greater than one.

To obtain a rapid cure rate at room temperature or below, it is preferred that the epoxide group be activated by an adjacent electron withdrawing group as in the glycidyl ethers, glycidyl esters, glycidyl thio ethers and glycidyl amines. Exemplary, although not limiting are one or more of the following epoxides.

Polyepoxides that may be used in this invention are disclosed in U.S. Pat. No. 2,633,458—Shokal—Mar. 31, 1953. Those portions of this patent which disclose examples of polyepoxides are incorporated by reference herein.

Other examples include the epoxidized esters of polyethylenically unsaturated monocarboxylic acids, such as epoxidized linseed, soybean, perilla, oiticica, tung, walnut, dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

Another group of the epoxy-containing materials used in the process of the invention include the epoxidized esters of unsaturated monohydric alcohols and polycarboxylic acids, such as, for example:
di (2,3-epoxybutyl) adipate
di (2,3-epoxybutyl) oxalate
di (2,3-epoxyhexyl) succinate
di (3,4-epoxybutyl) maleate
di (2,3-epoxyoctyl) pimelate
di (2,3-epoxybutyl) phthalate
di (2,3-epoxyoctyl) tetrahydrophthalate
di (4,5-epoxydodecyl) maleate
di (2,3-epoxybutyl) terephthalate
di (2,3-epoxypentyl) thiodipropionate
di (5,6-epoxytetradecyl) diphenyldicarboxylate
di (3,4-epoxyheptyl) sulfonyldibutyrate
tri(2,3-epoxybutyl) 1,2,4-butanetricarboxylate
di (5,6-epoxypentadecyl) tartarate
di (4,5-epoxytetradecyl) maleate
di (2,3-epoxybutyl) azelate
di (3,4-epoxybutyl) citrate
di (5,6-epoxyoctyl) cyclohexane-1,2-dicarboxylate
di (4,5-epoxyoctadecyl) malonate.

Another group of the epoxy-containing materials includes those epoxidized esters of unsaturated alcohols and unsaturated carboxylic acids, such as:
2,3-epoxybutyl 3,4-epoxypentanoate
3,4-epoxyhexyl 3,4-epoxyhexyl 3,4-epoxypentanoate
3,4-epoxycyclohexyl 3,4-epoxycyclohexanoate
3,4-epoxycyclohexyl 4,5-epoxyoctanoate
2,3-epoxycyclohexylmethyl epoxycyclohexane carboxylate.

Still another group of the epoxy-containing materials includes epoxidized derivatives of polyethylenically unsaturated polycarboxylic acids such as, for example:
dimethyl 8,9,12,13-diepoxyeicosanedioate
dibutyl 7,8,11,12-diepoxyoctadecanedioate
dioctyl 10,11-diethyl-8,9,12,13-diepoxyeicosanedioate
dihexyl 6,7,10,11-diepoxyhexadecanedioate
dodecyl 9-epoxy-ethyl-10,11-epoxyoctadecanedioate
dibutyl 3-butyl-3,4,5,6-diepoxycyclohexane-1,2-dicarboxylate
dicyclohexyl 3,4,5,6-diepoxycyclohexane-1,2-dicarboxylate
dibenzyl 1,2,4,5-diepoxycyclohexane-1,2-dicarboxylate
diethyl 5,6,10,11-diepoxyoctadecyl succinate.

Still another group comprises the epoxidized polyethylenically unsaturated hydrocarbons, such as epoxidized 2,2-bis (2-cyclohexenyl) propane, epoxidized vinyl cyclohexene and epoxidized dimer of cyclopentadiene.

Another group comprises the epoxidized polymers and copolymers of diolefins, such as butadiene. Examples include butadiene-acrylonitrile copolymers (Hycar rubbers), butadiene-styrene copolymers, etc.

Another group comprises the glycidyl containing nitrogen compounds such as diglycidyl aniline, the tetraepoxide of methylene dianiline and the triepoxide of amino phenol.

Polyepoxides particularly useful in the compositions of this invention are the glycidyl ethers of polyhydric phenols, including bis-phenols and novolacs and polyhydric alcohols. The glycidyl ethers of polyhydric phenols are obtained by reacting epichlorohydrin with the desired phenols in the presence of alkali. Polyether A and Polyether B described in U.S. Pat. No. 2,633,458 are examples of polyepoxides of this type. Other examples include the diglycidyl ether of 2,2-bis (4-hydroxyphenyl) propane, the diglycidyl ether of bis (4-hydroxyphenylmethane), the polyglycidyl ether of 1,1,2,2-tetrakis (4-hydroxyphenyl) ethane (epoxy value of 0.45 eq./100 g. and melting point 85° C.), the polyglycidyl ether of 1,1,5,5-tetrakis (hydroxyphenyl) pentane (epoxy value of 0.514 eq./100 g.) and their mixtures.

Further examples of polyepoxides prepared from polyhydric phenols are novolac resins. Novolac resins are produced by reaction of formaldehyde with a phenol, for example, phenol, alkyl, aryl or polyhydroxy phenols. The resulting polyglycidyl ethers are then prepared by reaction of an epihalohydrin, usually epichlorohydrin, with the novolac. Useful molecular weight range for the novolacs is from about 300 to about 1,000.

Further useful polyepoxides are glycidyl ethers from polyhydric alcohols such as glycerine, pentaerythritol, 1,2,6-hexanetriol and trimethylolpropane; glycidyl esters such as diepoxides prepared from phthalic acid, tetrahydrophthalic acid, hexahydrophthalic acid and dimer acids.

Polymercaptan

Polymercaptans which along with the catalyst are present in the curing system or curing agent component are well-known materials and the employment of same herein is not limited to any specific polymercaptan.

The polymercaptan component must have an —SH functionality greater than one. Although the molecules of the polymercaptan component can contain more, e.g., up to about ten—SH groups per molecule, the polymercaptan must be virtually free from molecules having only one—SH group. However, mono—SH compounds can be present in low amounts as modifiers and flexibilizers. Additionally the polymercaptan component should have an average molecular weight between about 100 and 20,000. Mercaptans having an —SH functionality greater than one but which have molecular weight below about 100 form products which can be undesirable because of their high volatility and noxious odor while polymercaptans having molecular weights above about 20,000 can be highly viscous and difficult to formulate with fillers, pigments and the like.

Exemplary, although not limiting are one or more of the following polymercaptans.

Useful polymercaptans are those prepared from polyepoxides having an epoxy functionality greater than one, i.e., the number of epoxy groups contained in the average polyepoxide molecule is greater than one. Such polyepoxides are converted to polymercaptans by reaction with hydrogen sulfide or by first converting the epoxide groups to halohydrin groups and thereafter reacting the halohydrin groups with a sulfhydrate such as sodium sulfhydrate or potassium sulfhydrate.

Polyepoxides which can be used in forming the polymercaptans include the reaction product of a halogen-containing epoxide such as an epihalohydrin with an aliphatic polyhydric alcohol, e.g., glycerol, pentaerythritol, 1,2,6-hexanetriol, or 1,3,5-pentanetriol. Since secondary alcohols are formed, it is then necessary to reform the epoxide ring by further reaction with caustic. Suitable epoxides for reaction with hydrogen sulfide can also be formed by reaction between aromatic polyhydric phenols such as resorcinol, catechol or bisphenol and halogen-containing epoxide such as an epihalohydrin or 3-chloro-1,2-epoxybutane and by reacting a polyhydric phenol or aliphatic polyhydric alcohol with a polyepoxide compound such as bis (2,3-epoxypropyl) ether, bis (2,3-epoxy-2-methylpropyl) ether. Since secondary alcohols are formed, in the first instance, it is then necessary to reform the epoxide ring by further reaction with caustic.

Other suitable polyepoxides as intermediates for polymercaptans include esters of epoxy acids and polyhydric alcohols or phenols containing three or more hydroxyl groups, for example, esters of 2,3-epoxypropionic acid reacted with glycerol or with 1,2,6-hexanetriol and esters of 3,4-epoxybutanoic acid and polyvinyl alcohol. Other polyepoxides are those esters of epoxy alcohols and polycarboxylic acids containing three or more carboxylic groups, e.g., triglycidyl ester of 1,2,4-butanetricarboxylic acid, triglycidyl esters of 1,3,6-hexanetricarboxylic acid and glycidyl ester of pyromellitic acid.

Polymercaptans which can be added as an admixture with polymercaptans formed from the above-described polyepoxide precursors and which for economy and efficiency advantageously form only about 20 weight percent or less of the total polymercaptan component include resins prepared from the reaction of hydrogen sulfide with polythiuranes. Other polymercaptans which can be mixed with the polymercaptans derived from the above-described precursors include epoxidized polymers and copolymers of compounds such as isoprene and butadiene which have been reacted with hydrogen sulfide across the double bonds such as limonene dimercaptan as well as mercaptoethyl esters of polyacrylic acid and mercaptobutyl esters of copolymers prepared from methacrylic acid and styrene.

Preferred polymercaptans are those prepared by initially reacting a polyhydric alcohol such as 1,2,6-hexanetriol, glycerol, trimethylol propane or pentaerythritol with an alkylene oxide, such as propylene oxide or ethylene oxide, there usually being a substantial molar excess of alkylene oxide present during reaction. Thereafter the resulting polyoxyalkylene-modified polyhydric alcohol is reacted with a halogen containing epoxide, e.g., an epihalohydrin or 3-chloro-1,2-epoxybutane, to prepare a halogenated polyhydric polyether from which the corresponding mercaptan polymer is obtained by reaction with a metallic sulfhydrate such as sodium sulfhydrate. Such resins include those disclosed in U.S. Pat. No. 3,258,495—LeFave et al—June 28, 1966. Those portions of this patent which disclose examples of polymercaptans are incorporated by reference herein. These polymercaptans usually have an average molecular weight range of from about 1,000 to about 7,000 and —SH functionality between about 2.0 and about 6.

Other useful polymercaptans are tris (mercaptoalkyl) cyclohexanes such as 1,2,4-tris (2-mercaptoethyl) cyclohexane and 1,3,5-tris (2-mercaptoethyl) cyclohexane.

Another group is polymercaptoalkyl esters of polycarboxylic acids containing at least eighteen carbon atoms prepared by reacting mercapto alcohols containing up to ten carbon atoms with the appropriate polycarboxylic acids such as those commonly referred to as polymeric fatty acids.

Other examples are polymercaptans having at least three mercapto substituted side chains attached to one or more aromatic rings such as the following:
1,2,3-tri (mercaptomethyl) benzene
1,2,4-tri (mercaptomethyl) benzene
1,3,5-tri (mercaptomethyl) benzene
1,3,5-tri (mercaptomethyl)-4-methyl benzene
1,2,4-tri (mercaptoethyl)-5-isobutyl benzene
1,2,3-tri (mercaptomethyl)-4,5-diethyl benzene
1,3,5-tri (mercaptomethyl)-2,6-dimethyl benzene
1,3,5-tri (mercaptomethyl)-4-hydroxy benzene
1,2,3-tri (mercaptolbutyl)-4,6-dihydroxy benzene
1,2,4-tri (mercaptomethyl)-3-methoxy benzene
1,2,4-tri (mercaptoethyl)-4-aminoethyl benzene
1,3,5-tri (mercaptobutyl)-4-butoxy benzene
1,2,4,5-tetra (mercaptomethyl)-3,6-dimethyl benzene
1,2,4,5-tetra (mercaptoethyl)-3,6-dimethoxy benzene
1,2,4-tri (mercaptomethyl)-3-(N,N-dimethylamino) benzene
1,3,5-tri (mercaptobutyl)-4-(N,N-dibutylamino) benzene
1,2,4,5-tetra (mercaptomethyl)-3,6-dihydroxy benzene
3,4,5-tri (mercaptomethyl) furan
2,3,5-tri (mercaptoethyl) furan
2-butyl-3,4,5-tri (mercaptomethyl) furan
3,4,5-tri (mercaptomethyl) thiophene
2,3,5-tri (mercaptomethyl) thiophene
2-isobutyl-3,4,5-tri (mercaptoethyl) thiophene
3,4,5-tri (mercaptobutyl) pyrrole
2,3,5-tri (mercaptomethyl) pyrrole
2,4,6-tri (mercaptomethyl) pyridine
2,3,5-tri (mercaptomethyl) pyridine
2,4,6-tri (mercaptomethyl)-5-butyl pyridine
2,4,6-tri (mercaptomethyl-5-vinyl pyridine
2,3,5-tri (mercaptobutyl)-4-allyl pyridine
2,3,5-tri (mercaptomethyl) thionaphthene
2,3,5-tri (mercaptomethyl) quinoline
3,4,6-tri (mercaptomethyl) isoquinoline Other examples of these compounds include, among others, the poly (mercaptoalkyl) substituted benzenes, the poly (mercaptoalkyl) substituted naphthalenes, the poly (mercaptoalkyl) substituted bisphenyls, the poly (mercaptoalkyl) substituted bis (phenyl) alkanes, poly (mercaptomethyl) bis (hydroxyphenyl) alkanes, the poly (mercaptoalkyl) substituted bis (hydroxyphenyl) sulfones, poly (mercaptomethyl) substituted bis (phenyl) sulfone, the poly (mercaptoalkyl) substituted bis (hydroxyphenyl) sulfides, the poly (mercaptoalkyl) substituted bis (hydroxyphenyl) oxides, poly (mercaptoalkyl) substituted bis (phenyl) oxides, poly (mercaptoalkyl) substituted bis (chlorophenyl) alkanes and the like.

Specific examples include, among others:
4-mercaptomethylphenyl-4',5'-dimercaptomethylphenylmethane
2,2-bis (4,5-dimercaptomethylphenyl) propane
2,2-bis (4,6-dimercaptobutylphenyl) butane
4-mercaptomethylphenyl-3',4'-dimercaptomethylphenyl oxide
4-mercaptomethylphenyl-3',4'-dimercaptomethylphenyl sulfone
2,2-bis (4,5-dimercaptoethylphenyl) sulfide
the 3,4-dimercaptomethylphenyl ester of carbonic acid
the 3,4-dimercaptoethylphenyl ester of maleic acid
1,3,5-tri (mercaptomethyl)-2,4,6-trimethylbenzene
2,2-bis (3-butyl-4,5-dimercaptoethylphenyl) hexane
1,3,5-tri (4-mercapto-2-thiabutyl) benzene
1,3,5-tri (4-mercapto-2-oxabutyl) benzene
2,3-bis (4,5-dimercaptobutyl-3-chlorophenyl) butane
4-mercaptobutylphenyl-3',4'-dimercaptomethylphenyl oxide
3-mercaptobutylphenyl-2',4'-dimercaptobutylphenyl oxide Additional polymercaptans include the trioxanes, trithianes, dioxathianes, oxadithianes, oxazines, triazines, thiazines, dithiazines, dioxarsenoles, oxathiazoles, dithiazoles, triazoles, dioxalanes, isoxazoles, isothiazoles, dioxaborines, dioxazines, thiodiazines, and the like, which have at least three mercapto-substituted radicals attached to the said rings.

Specific examples of these include, among others:
2,4,6-tis (beta-mercaptoethyl) 1,3,5-trioxane
2,4,6-tris (beta-mercaptoethyl) 1,3,5-trithiane
2,4,6-tris (mercaptomethyl) 1,3,5-trioxane
2,4,6-tris (mercaptomethyl) 1,3,5-trithiane
2,4,6-tris (beta-mercaptoethyl) 1,3-dioxa-5-thiane
2,4,6-tris (beta-mercaptoethyl) 1-oxa-3,5-dithiane
2,4,5-tris (beta-mercaptoethyl) 1,3-dioxalane
2,4,6-tris (alpha-methyl-beta-mercaptoethyl) 1,3,5-trioxane
2,4,6-tris (beta-methyl-beta-mercaptoethyl) 1,3,5-trithiane
2,4,6-tris (beta-mercaptobutyl) 1,3,5-trioxane
2,4,6-tris (beta-mercaptohexyl) 1,3,5-trithiane
2,4,6-tris (beta-phenyl-beta-mercaptoethyl) 1,3,5-trioxane
2,4,6-tris (beta-cyclohexyl-beta-mercaptoethyl) 1,3,5-trioxane
2,4,6-trimercapto 1,3,5-trioxane
2,4,6-trimercapto 1,3,5-trithiane
2,4,6-tris (1-thia-4-mercaptobutyl) 1,3,5-trioxane
2,4,6-tris (1-oxa-4-mercaptobutyl) 1,3,5-trioxane
2,3,6-tris (beta-mercaptoethyl) 1,4-oxazine
2,4,6-tris (3-mercaptopropyl) 1,3,5-triazine
2,4,6-tris (mercaptomethyl) 1,3,5-triazine
2,4,6-tris (beta-mercaptoethyl) 1-thia-3,5-diazine Examples of polymercaptants containing at least four—SH groups are polymercapto-substituted ethers such as tri (2,3-dimercaptopropyl) ether of glycerol, di (3,4-dimercaptobutyl) ether of diethylene glycol, di (2,3-dimercaptohexyl) ether of 1,4-butanediol, di (2,3-dimercaptocyclohexyl) ether of 1,5-pentanediol, tri (2,3-dimercaptopropyl) 1,2,6-hexanetriol, di (2,3-dimercaptopropyl) ether of sulfonyldipropanol, di (2,3-dimercaptopropyl) ether of 1,4-dimethylolbenzene, tri (2,3-dimercaptobutyl) ether of trimethylpropane, poly (2,3-dimercaptopropyl) ether of polyallyl alcohol, di (3,4-dimercaptobutyl) ether, di (2,3-dimercaptopropyl) ether, di (2,3-dimercaptopropyl) ether of resorcinol, di (3,4-dimercaptohexyl) ether of resorcinol, tri (3,4-dimercaptoctyl) ether of 1,3,5-trihydroxybenzene, di (2,3-dimercaptopropyl) ether of 2,2-bis (4-hydroxyphenyl) propane, di (3,4-dimercaptobutyl) ether of 2,2-bis (4-hydroxyphenyl) butane, tetrakis (2,3-dimercaptopropyl) ether of 1,1,2,2-tetra (4-hydroxyphenyl) ethane, tetrakis (3,4-dimercaptobutyl) ether of 1,1,5,5-tetra (4-hydroxyphenyl) pentane, di (3,4-dimercaptohexyl) ether of 2,2-bis (4-hydroxyphenyl) sulfone, di (3,4-dimercaptobutyl) ether of 2,2-bis (4-hydroxy-5-methoxyphenyl) 1,1-dichloropane, and the like.

Other examples include the polymercapto-substituted esters, such as di (2,3-dimercaptopropyl) phthalate, di (3,4-dimercaptobutyl) tetrachlorophthalate, di (2,3-dimercaptopropyl) terephthalate, di (3,4-dimercaptohexyl) adipate, di (2,3-dimercaptobutyl) maleate, di (2,3-dimercaptopropyl) sulfonyldibutyrate, di (3,4-dimercaptooctyl) thiodipropionate, di (2,3-dimercaptohexyl) citrate, di (3,4-dimercaptoheptyl) cyclohexanedicarboxylate, poly (2,3-dimercaptopropyl) ester of polyacrylic acid and poly (2,3-dimercaptohexyl) ester of polymethacrylic acid.

One of the advantages of this invention is that the polymercaptans need not be limited to those having beta activating groups such as hydroxyl, ester, phenyl and nitrile groups. The amount of polymercaptan is from about 0.1 to about 1.50 equivalents, preferably from about 0.30 to about 1.0 equivalents per equivalent of polyepoxide.

When the polymercaptan is present in amounts of from about 0.1 to about 0.3 equivalents per equivalent of polyepoxide, it may be employed as a co-curing agent, i.e., in combination with other curing agents such as amidoamines, polyamides, aliphatic amines and anhydrides. The invention herein is applicable under such conditions.

Catalyst

The catalyst, which along with the polymercaptan is present in the curing system or hardener component, is one or more poly [(N,N-dimethylamino) alkyl] ether compounds (tertiary amine ethers) present in amounts of from about 0.1 to about 20.0 parts by weight, preferably from about 0.5 to about 10.0 parts by weight, per 100 parts by weight of polyepoxide. The catalyst is one or more compounds containing two, three or four N,N-dimethylaminoalkyl substituents of the formula:

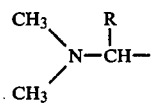

where R represents hydrogen or straight or branched chain alkyl radicals having from one to ten carbon atoms, e.g., methyl, ethyl, n-propyl, isopropyl, amyl, 2-ethylhexyl, octyl, nonyl and decyl, and in any one compound, R can be the same or different. The moiety to which the two, three or four N,N-dimethylaminoalkyl substituents is attached is not critical so long as it does not interfere with the stability and the activity of the catalyst and so long as the dimethylamino groups are one, two or three carbon atoms removed from an ether oxygen.

More specifically, these catalysts are represented by the formula:

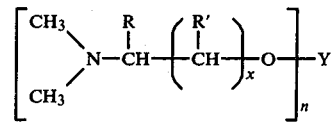

where R is the same as above, R' is the same as R or is dimethylamino methyl or dimethylaminoethyl, x is 0,1 or 2, n is 1,2,3 or 4 depending upon the nature of Y and R' with the proviso that in any one compound, there are only two, three or four N,N-dimethylaminoalkyl groups and in any one compound R can be the same or different and R' can be the same or different and in any one compound, x can be the same or different and Y can be aliphatic, substituted aliphatic, heterocyclic, alicyclic or aromatic, for example, derived from methane, ethane, propane, butane, 2-ethyl 2-methyl propane, hexane, pyridine, furan, thiophene, pyrrole, quinoline, trioxane, trithiane, dioxalene, oxazine, triazine, cyclohexane, cyclopropane, benzene, naphthalene, diphenylmethane, diphenylsulfide and phenol and with the proviso that when n is 1, Y is:

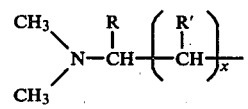

where R and R' and x are the same as above.

Particularly useful tertiary amine ethers have the following structure:

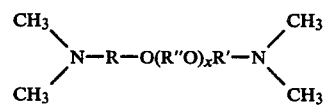

where R, R' and R" represent methylene, ethylene, n-propylene, isopropylene or iso-butylene and in any one compound R, R' and R" can be the same or different and x is 0 or 1. That is, the alkyl (or alkylene depending upon nomenclature) substituents can be the same or different, i.e., in any one catalyst, where x is 0, R and R' can be methyl methyl, methyl ethyl, ethyl ethyl, methyl n-propyl, methyl iso-propyl, ethyl n-propyl, ethyl iso-propyl, etc. Where x is 1, R, R" and R' can be, e.g., ethyl, methyl, ethyl or ethyl, ethyl, ethyl.

Examples of catalysts are:

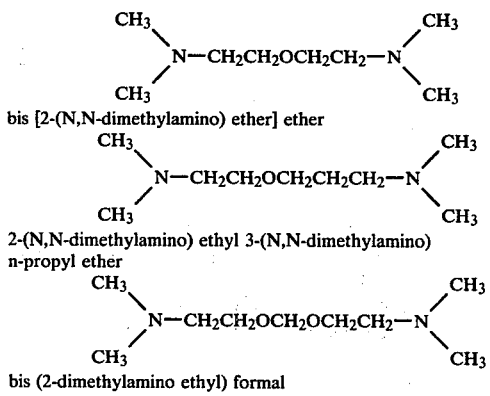

bis [2-(N,N-dimethylamino) ether] ether 2-(N,N-dimethylamino) ethyl 3-(N,N-dimethylamino) n-propyl ether bis (2-dimethylamino ethyl) formal -continued

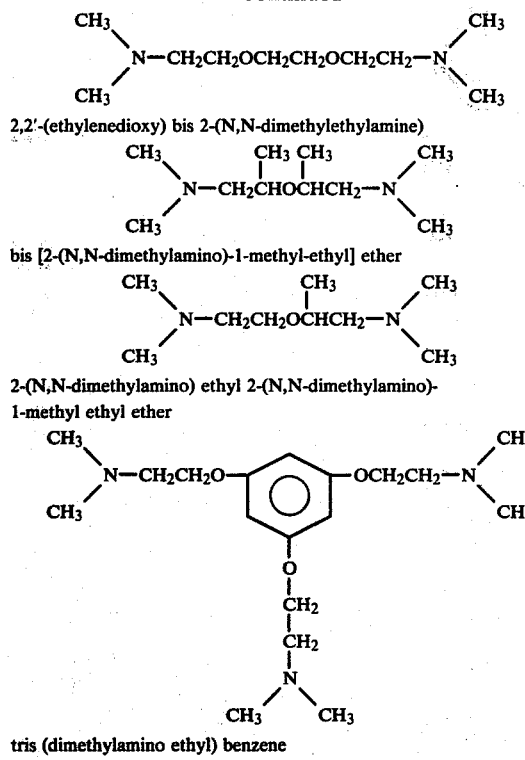

2,2'-(ethylenedioxy) bis 2-(N,N-dimethylethylamine)

bis [2-(N,N-dimethylamino)-1-methyl-ethyl] ether 2-(N,N-dimethylamino) ethyl 2-(N,N-dimethylamino)-1-methyl ethyl ether tris (dimethylamino ethyl) benzene 2,4,6-tris (dimethylamino ethoxy) phenol

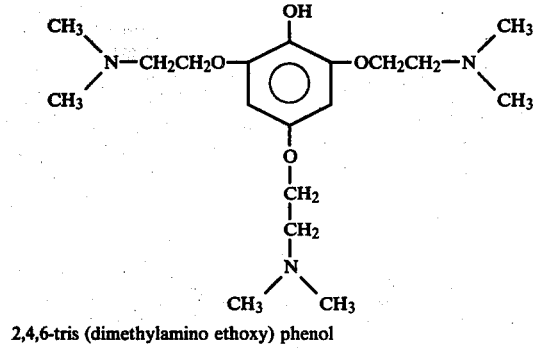

1,3-bis dimethylamino-2-(2-dimethylamino ethoxy) propane 1,3-bis dimethylamino-2-(2,3-bis dimethylamino propyloxy) propane

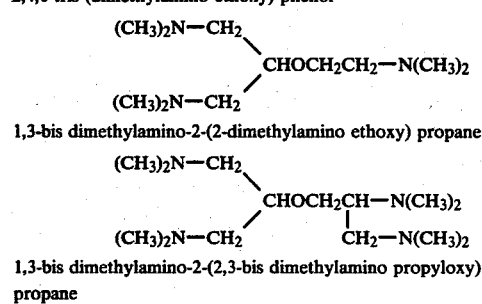

1,2,3-tri (dimethylamino ethoxy) propane

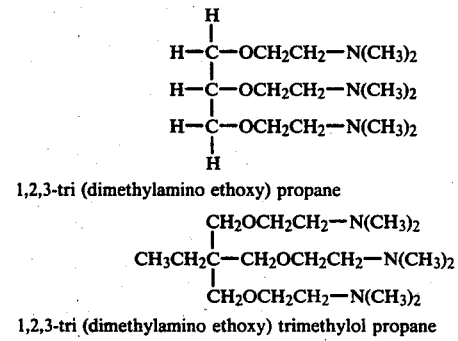

1,2,3-tri (dimethylamino ethoxy) trimethylol propane

-continued

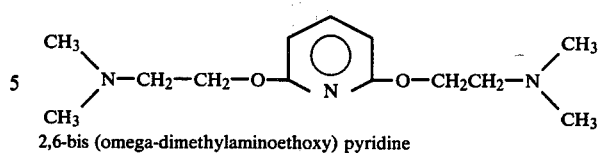

2,6-bis (omega-dimethylaminoethoxy) pyridine

The preferred tertiary amine ethers are [2-(N,N-dimethylamino) ethyl] ether and 2-(N,N-dimethylamino) ethyl 3-(N,N-dimethylamino) n-propyl ether.

As examples of synthesis, bis [2-(N,N-dimethylamino) ethyl] ether can be prepared by reaction of bis (2-chloroethyl) ether with excess dimethylamine. This synthesis is reported by Marxer et al, K Helv Chim Acta 34,924 (1951) and by Hromataka et al, Monatsh 84,349 (1953).

Another route to this compound is to employ the classical Williamson ether synthesis using, for example, dimethylaminoethyl chloride as shown below:

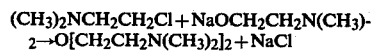

$(CH_3)_2NCH_2CH_2Cl + NaOCH_2CH_2N(CH_3)_2 \rightarrow O[CH_2CH_2N(CH_3)_2]_2 + NaCl$ This method can be employed to produce bis [2-(N,N-dimethylamino)-1-methyl ethyl] ether and 2-(N,N dimethylamino) ethyl-2-(N,N dimethylamino)-1-methyl ethyl ether as reported by Fakstorp et al, Acta Chemica Scandinavica 7, pages 134–139 (1953).

Where increased hardness and water resistance is desired in the cured polyepoxide, the tertiary amine ethers may be used together with conventional catalysts, i.e., co-catalysts, while still preserving their unique properties. There may be present in amounts up to about 20 parts by weight per 100 parts by weight of epoxide, e.g., 1.0 to 20 parts by weight, of at least one organic sulfide, tertiary phosphine or tertiary amine having no bridged atoms in the structure, having no ether oxygen and having at least one tertiary amino group. A preferred class of tertiary amine co-catalysts which can be used encompasses those compounds represented by the following formula:

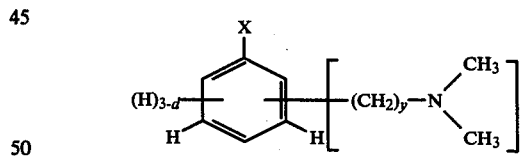

where d is an integer of from 1 to 3 inclusive, x is hydrogen or hydroxyl, and y is 1 or 2.

Included among such amines are benzyl dimethylamine; dimethylaminomethyl phenol; dimethylaminoethyl phenol; 2,4-di(dimethylaminomethyl) phenol; 2,4,6-tri (dimethylaminomethyl) phenol; alpha methylbenzyldimethylamine and the like.

Other tertiary amines which are suitable are dimethylcyclohexylamine; N,N-dimethylpiperazine, dimethylamino ethanol; N-methyl diethanolamine; triethylamine; N-methyl morpholine; tetramethyl 1,3-butane diamine; tetramethylethylene diamine;

1,2,4-trimethylpiperazine; 1-methylimidazole; N-methyl-4-(2 dimethylaminoethyl)piperazine; N,N,N-tris (dimethylaminopropyl) synhexahydrotriazine; N (2-dimethylaminoethyl) morpholine; octadecyl dimethylamine; hexadecyldimethylamine and the like.

Useful sulfides can be dibutyl sulfide, dioctyl sulfide, dicyclohexyl sulfide, etc. while useful phosphines are triamyl phosphine, triphenyl phosphine, tributyl phosphine, etc.

An unusual characteristic of the epoxy/mercaptan reaction in general is an initial induction period where the catalyzed mixture remains fluid and workable which is followed by a sharp transition when curing commences. This is indicated by evolution of heat followed very shortly thereafter by gelation. These stages are much more distinct in mercaptan cured epoxy resin systems than with other classes of epoxy hardeners where, at ambient and low temperatures, the transition from the liquid to gel state is much more gradual especially in small masses. This follows from the mercaptan/epoxy reaction mechanism described by Tanaka and Mika in "Epoxy Resins" edited by May and Tanaka, published by Marcel Dekker (1973). See page 168, reaction (28). The initial fluid stage or pot life is important in commercial practice to allow sufficient time to apply, cast or otherwise handle the system prior to the onset of gelation.

It has been discovered that the tertiary amine ethers may be complexed or reacted with certain weakly acidic materials forming non-quaternized salts which extend the induction period for pot life. These materials are known as cure initiation inhibitors.

This technology has been previously described for regulating tertiary amines such as 2,4,6 tri (dimethylaminomethyl) phenol when curing epoxy resins by homopolymerization at elevated temperatures in the absence of polymercaptans. See "Physical Properties of 2,4,6-Tri-Dimethylaminomethyl Phenol Triacetate" by Bondi and Parry, Journal of Physical Chemistry, 60,1406 (1956). Unexpectedly it has been found that even when the pot life or induction period has been extended using the unique tertiary amine ether catalyst, for example, by ten times via non-quaternized salt formation with the same, the novel tertiary amine ethers cause a gel point equally as sharp as in the absence of any salt formation. In other words, extending the usable life of the catalyzed epoxy/mercaptan mixture via this technique causes no sacrifice in the cure rate once it commences, a discovery of significant commercial value.

The cure initiation inhibitor may be one or more of any organic compound with a weakly acidic pH or having a pKa which is greater than about 3.5 and preferably greater than about 4.0 and is more acidic (lower pKa) than the polymercaptan present (polymercaptans have pKa from about 6.5 to about 10.5). If the inhibitor is too strongly acidic, for example, the mineral acids, the tertiary amine ether may be completely deactivated and may require external heat to cause breakdown of the salt complex. Preferred are the organic acids and acidic esters. Particularly preferred are organic mono and polycarboxylic acids with pKa values greater than about 4.0 with limited solubility in water which form salts soluble in polymercaptans on storage at ambient temperatures such as n-octanoic, 2-ethylhexoic, pelargonic, decanoic, neo-decanoic, naphthenic, lauric, oleic, succinic, adipic, azelaic and isostearic acids. Other cure initiation inhibitors are acidic esters such as tris (2-chloroethyl) phosphate and tris (2,3-dibromopropyl) phosphate. The preferred cure initiation inhibitors are isostearic acid, oleic acid and naphthenic acids.

The ratio of the acidic group of the retarder, such as carboxylic, to the tertiary nitrogen atoms in the tertiary amine ether determines the length of the induction period or pot life; with increased ratios of acidic materials providing the longest times. The ratio of acidic group:tertiary nitrogen may be from about 0.005:1.0 to 1.0:1.0. Preferred ratios are from about 0.01:1.0 to about 0.20:1.0.

The salts may be produced by simple blending of the tertiary amine ether and cure initiation inhibitor and with or without external heat and in the presence or absence of volatile solvents as reaction media, depending upon the type of retarder employed. These salts may be blended with other co-catalysts, including other tertiary amine catalysts, with the resulting mixture then added to the polymercaptan component. The initiation inhibitor may be preblended with the mixture of tertiary amine ethers and other co-catalysts, if employed, followed by addition to the polymercaptan. The tertiary amine ethers, in the presence or absence of any other co-catalysts, may be complexed in situ in the polymercaptan by dissolving the acidic material in the mixture of catalyzed polymercaptan. Such in situ neutralized materials reach an equilibrium after a short period at room temperature as indicated by measurement of pot life against time from addition of acid. Equilibrium is indicated when the pot life ceases to change with time. Note, that when the cure initiation inhibitor is added to the catalyst before same is admixed with a tertiary amine co-catalyst or is added to a mixture of the catalyst and tertiary amine co-catalyst, the cure initiation inhibitor will be in equilibrium with both, thus forming non-quaternized salts with both. This in no way detracts from the function of the cure initiation inhibitor.

It has been further shown that hardener mixtures of polymercaptans, tertiary amine ethers, cure initiation inhibitors, with or without co-catalysts or other materials used in the technology of epoxy resin formulating are, like the unmodified tertiary amine ether, sufficiently stable on ambient temperature storage as to provide commercial suitability.

Ancillary Ingredients

Curable polyepoxide compositions containing the novel catalysts of the present invention can also contain conventional fillers, extenders, solvents and the like. For example, when using curable polyepoxide compositions as protective coatings, commonly used organic solvents, e.g., aromatic hydrocarbons such as benzene, toluene and xylene, ketones such as methyl ethyl ketone and methyl iso-butyl ketone, ethers such as dioxane, tetrahydrofuran, tetrahydropyran, Cellosolves, such as Cellosolve acetate (ethylene glycol monoethyl ether acetate), Carbitols, such as Carbitol acetate (diethylene glycol monoethyl ether acetate), higher polyethylene and polypropylene glycol ethers and etheresters, and the like, as well as mixtures thereof, can be present. Similarly, fillers such as sand, silica flour, aluminum silicate, clays, asbestos, Wollastonite, barytes, marble chips, marble dust, glass fibers, carbon black, titanium dioxide and the like, can be employed when the curable polyepoxide compositions are used for such purposes as sealants or adhesives, or in terrazzo tile, or the like. Compositions may also contain catalyst promoters such as hydroxyl compounds as in alcohols. Also employed are flexibilizers such as epoxidized glycols, high molecular weight dimercapto polysulfide polymers such as Thiokol LP-3 and epoxy terminated copolymers such as Kelpoxy G272-100 (Spencer Kellogg) and plasticizers such as dibutyl phthalate. The filler volume concentration can vary from about 0% to about 80% of the total system. It should be noted that care must be exercised when using ancillary materials of an acidic nature where cure retardation is not desirable.

To improve odor, a reordorant or deodorant may also be included in the formulation. Generally, from about 0.1 to about 0.4% by weight reodorant is used base upon the weight of the hardener.

There are many applications where it is desirable to use a curable polyepoxide composition in the form of a film. For instance, it would be highly desirable to employ curable polyepoxide compositions containing conventional reflective materials (to which the cured polyepoxide resin adheres) as relatively thin strips, e.g., in the order of from about 0.5 mil to about 60 mils in thickness, on concrete or asphalt roadways to provide durable traffic control markings such as lane markers, stop lines and other warning or directional markings. Such application is one in which the generally good adhesiveness, toughness and durability of polyepoxide resins could be of great benefit and the fast cure of the polymercaptan epoxy system is required. This can be achieved by employing the curing system described herein which works rapidly and still gives cured films which exhibit the desired properties.

Similarly, polyepoxides are valuable in numerous adhesive applications, such as in bonding metal to metal, bonding new concrete to old, bonding electrical fixtures to walls and ceilings, bonding traffic buttons to roadways to provide traffic control markings, in do-it-yourself epoxy resin adhesive kits, as protective coatings on many metals, or as sealants for joints in concrete curtain walls or slab ceilings. Here too, the curing systems described herein enhance the use of curable polyepoxides for these purposes.

Moreover, when using the curing systems described herein, polyepoxide films and coatings can be satisfactorily cured more rapidly and completely at lower temperatures, even as low as 0° F. (−18° C.), particularly on basic or neutral surfaces or substrates such as Portland Cement concrete and the like, than had hitherto been possible using known catalyst systems. Consequently, other construction adhesive applications where low temperatures are encountered become possible thus permitting extension of the work year in the colder months. As previously stated, all other known conventional ambient temperature curing agents such as aliphatic amines, amidoamines and polyamide resins are much more dependent upon external temperature and film thickness for their cure times.

Further, the catalysts disclosed herein are generally low viscosity liquids which are easily incorporated into the curing system at virtually all stages of production.

These activators do not exhibit the previously mentioned hardness development stagnation or marked reduction in initial reaction rate after cure has commenced as in the case of triethylene diamine and other fused ring tertiary amines.

It was most unexpected that the catalysts disclosed herein which exhibit neither the low degree of steric hindrance of the fused ring tertiary amines nor the basicity of other tertiary amines have been shown to promote a more rapid and complete reaction between polyepoxides and polymercaptans than other types, especially at low temperatures. They are more effective than the fused ring tertiary amines in that they continue to be effective throughout the crosslinking reaction stage despite the initial faster reaction rate of the fused ring tertiary amines which then become hindered.

For a fuller understanding of this invention, reference may be made to the following examples. These examples are given merely to illustrate the invention and are not to be construed in a limiting sense. In the following examples the cure rate, pot life and thin film set time were measured as described below. The ratio of pot life to thin film set time was calculated as described below.

Cure Rate—Development of hardness as determined by use of Barcol Hardness Tester, Model 935 (Plastics model) on the top surface of a thin film of approximately 30 mils thickness. Read every 2–5 minutes initially. Take frequent readings for first two hours when curing at 77° F. and frequent readings during the first four hour period when curing at 40° F., then every day until hardness readings are constant.

Pot Life—Time to gel for a 15 gram mass of approximately 0.2 inches thick conditioned initially at 77° F.

Thin-film set time (gel time)—Time of approximately 30 mil film to set-to-touch as defined by probing gently with a tongue depressor. Test at 77° F. and 40° F. For 40° F. testing, pre-cool epoxy resin and hardener components before mixing to 40° F.

P.R. (ratio of pot-life to thin film set time)—Determined by calculation.

Time to Barcol 0 (handling strength) and time to Barcol 40 (working strength)—Determined by plotting readings on semi-log graph paper with time on the logarithmic scale followed by extrapolation to Barcol 0 and interpolation to Barcol 40 or by frequent Barcol hardness measurements which would pinpoint the exact times that these values are reached.

EXAMPLE I

An epoxy hardener composition was prepared by hand mixing at room temperature (a) 36 parts by weight of polymercaptan described below, (b) 36 parts by weight of limonene dimercaptan and (c) 0.5 parts by weight of 2-(N,N-dimethylamino) ethyl 3-(N,N-dimethylamino) n-propyl ether catalyst. The polymercaptan is described as follows.

The polymercaptan is based on a propylene oxide derivative of pentaerythritol of molecular weight of about 400–410 which is reacted with epichlorohydrin. The resulting epichlorohydrin adduct is dehydrochlorinated with sodium hydroxide to form the polyepoxide which is converted with hydrogen sulfide to polymercaptan of molecular weight of about 870, a viscosity of 15,000 cps. (Brookfield viscosity) and a mercaptan equivalent weight of 280. It is characterized by a hydroxyl group beta to each mercaptan group.

The epoxy resin was a simple blend of (a) 62.5 parts by weight of an epoxy novolac resin of the following structure:

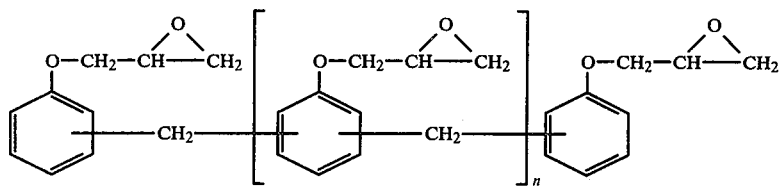

where n is 1.6, and having an epoxide equivalent weight of 176–181 and a viscosity of 20,000–50,000 cps. @125° F. and (b) 37.5 parts by weight of neopentyl glycol diglycidyl ether.

The epoxy hardener composition and epoxy resin were hand mixed at room temperature. The beginning of the experiment was taken as the onset of mixing.

EXAMPLE II

Example I was repeated except that 1.5 parts by weight of the catalyst was present in the hardener composition.

EXAMPLE III

Example I was repeated except that 3.0 parts by weight of the catalyst was present in the hardener composition.

EXAMPLE IV

Example I was repeated except that 5.0 parts by weight of the catalyst was present in the hardener composition.

EXAMPLE V

Example I was repeated except that 7.0 parts by weight of the catalyst was present in the hardener composition.

EXAMPLE VI

Example I was repeated except that the catalyst was replaced with 3.5 parts by weight of 2,4,6-tri (dimethylaminomethyl) phenol.

The following data, summarized below was obtained using the previously described procedures at 77° F.

| | Pot Life (Min.) | Thin Film Set (Min.) | P.R. | Time To Barcol 0 (Min.) | Time To Barcol 40 (Min.) |
|---|---|---|---|---|---|
| Example I | 26.0 | 32.0 | 1.2 | 79.0 | >150 |
| Example II | 12.5 | 15.0 | 1.2 | 22.0 | 73.0 |
| Example III | 8.5 | 9.5 | 1.1 | 15.0 | 18.5 |
| Example IV | 6.5 | 8.0 | 1.2 | 12.5 | 14.5 |
| Example V | 6.0 | 7.0 | 1.2 | 10.5 | 11.0 |
| Example VI | 18.0 | 21.5 | 1.2 | 30.0 | 52.0 |

A pair of control experiments were run as follows:

EXAMPLE VII

The polyepoxide resin component was 100 parts by weight of the diglycidyl ether of 2,2-bis (4-hydroxy phenyl) propane having a functionality of about two and an epoxy equivalent weight of 190.

The hardener component was a simple blend of 60 parts by weight of the polymercaptan described in Example I and 6 parts by weight of 2,4,6-tri (dimethylaminomethyl) phenol as catalyst. The two components were brought together and hand mixed at room temperature. Testing was carried out as described above.

EXAMPLE VIII

Example VII was repeated except that the catalyst was replaced with 6 parts by weight of 2-(N,N-dimethylamino) ethyl 3-(N,N-dimethylamino) n-propyl ether. The following data summarized below was obtained using the previously described procedures at 77° F.

| | Pot Life (Min.) | Thin Film Set (Min.) | P.R. | Time To Barcol 0 (Min.) |
|---|---|---|---|---|
| Example VII | 3.0 | 3.5 | 1.2 | 70.0 |
| Example VIII | 2.5 | 3.0 | 1.2 | 30.0 |

EXAMPLE IX

Example I was repeated except that the catalyst was replaced with 2.86 parts by weight of a 70/30 parts by weight blend of triethylene diamine and dipropylene glycol.

EXAMPLE X

Example I was repeated except that the catalyst was replaced with 2.86 parts by weight of a 70/30 parts by weight blend of bis [2-(N,N-dimethylamino) ethyl] ether and dipropylene glycol. The following data was obtained using the previously described procedure at 77° F.

| | Pot Life (Min.) | Thin Film Set Time (Min.) | P.R. |
|---|---|---|---|
| Example IX | 3.5 | 4.0 | 1.1 |
| Example X | 8.0 | 10.0 | 1.2 |

| Example IX | | Example X | |
|---|---|---|---|
| Mins. from Start of Mixing | Barcol Hardness | Mins. from Start of Mixing | Barcol Hardness |
| 26.5 | 0 | 35 | 0 |
| 31.0 | 7 | 45 | 15 |
| 36.5 | 12 | 60 | 16 |
| 50.5 | 12 | 71 | 23 |
| 64.5 | 16 | 85 | 40 |
| 81.5 | 15 | | |

The following examples illustrate the ability of the tertiary amine ethers to catalyze allyl mercaptans, i.e., those not possessing beta activating groups as hydroxyl groups, ester groups, nitrile groups and the like.

EXAMPLE XI

The epoxy resin employed was 100 parts by weight of a diglycidyl ether of 2,2-bis (4-hydroxyphenyl) propane having a viscosity of about 14,000 cps. and an epoxide equivalent weight of 190.

The hardener was a simple blend of 75 parts by weight of the polymercaptan described below, 0.5 parts by weight of 2-(N,N-dimethylamino) ethyl 3-(N,N-dimethylamino) n-propyl ether.

The polyepoxide resin and hardener were mixed together at room temperature.

The polymercaptan was the polymercaptan based on the allyl ether of propoxylated pentaerythritol and was prepared as described in Example 1 of U.S. Pat. No. 4,092,293—Harris et al—May 30, 1978. This polymercaptan has the structure:

| Structure | Average Number of Side Chains per Molecule |
|---|---|
| R—(OH) | 0.49 |
| (OCH$_2$CH=CH$_2$) | 0.25 |
| (OCH$_2$CH$_2$CH$_2$S$_{1/2}$) | 1.12 |
| (OCH$_2$CH$_2$CH$_2$SH) | 2.14 |
|  | 4.00 (Total) | where R is a propoxylated pentaerythritol moiety having a molecular weight of about 400. The mercaptan equivalent of the polymercaptan is 3.39 meq/g; percent by weight of sulfur is 13.7% and viscosity is 5.4 poise at 25° C.

EXAMPLE XII

Example XI was repeated except 6 parts by weight of catalyst was used in the hardener component and the polyepoxide resin and hardener components were mixed in a 100 to 81.0 ratio by weight.

EXAMPLE XIII

Example XI was repeated except 10 parts by weight of catalyst was used in the hardener component and the polyepoxide resin and hardener components were mixed in a 100 to 85 ratio by weight.

EXAMPLE XIV

Example XI was repeated except 15 parts by weight of catalyst was used in the hardener component and the polyepoxide resin and hardener components were mixed in a 100 to 90 ratio by weight.

EXAMPLE XV

Example XI was repeated except 20 parts by weight of catalyst was used in the hardener component and the polyepoxide and hardener components were mixed in a 100 to 95 ratio by weight.

EXAMPLE XVI

Example XI was repeated except 0.5 parts by weight of 2,4,6-tri (dimethylaminomethyl) phenol was used as the catalyst in the hardener component and the polyepoxide and hardener components were mixed in a ratio of 100 to 75.5 by weight.

EXAMPLE XVII

Example XI was repeated except 6.0 parts by weight of 2,4,6-tri (dimethylaminomethyl) phenol was used as the catalyst in the hardener component and the polyepoxide and hardener components were mixed in a ratio of 100 to 81 parts by weight.

The following data, summarized below was obtained using the previously described procedures at 77° F.

| Example | Pot Life (Min.) | Thin Film Set (Min.) | 24 Hr. Barcol |
|---|---|---|---|
| XI | 16 | 18 | <0 |
| XII | 5 | 6 | 60 |
| XIII | 6 | 7 | 79 |
| XIV | 5 | 6 | 75 |
| XV | 5 | 6 | 79 |
| XVI | 67 | 69 | 0 |
| XVII | 40 | 41 | 16 |

EXAMPLE XVIII

In this example, the polyepoxide was the same as in Example I.

The hardener component was a simple blend of (a) 44.832 parts by weight of the polymercaptan of Example I, 44,832 parts by weight of limonenedimercaptan, (c) 2.491 parts by weight of 2-(N,N-dimethylamino) ethyl 3-(N,N-dimethylamino) n-propyl ether, (d) 7.472 parts by weight of 2,4,6-tri (dimethylaminomethyl) phenol and (e) 0.373 parts by weight of a perfumed deodorant (Veilex 05057 of Monsanto).

The above hardener component and polyepoxide were hand mixed together at a mix ratio of 100 parts by weight of polyepoxide to 83 parts by weight of hardener component.

EXAMPLE XIX

Example XVIII was repeated except that 0.2026 parts by weight of 2-ethylhexoic acid was added to 83 parts by weight of the hardener component. The mix ratio of polyepoxide to hardener composition was 100 parts by weight of polyepoxide to 83.2026 parts by weight of hardener component.

EXAMPLE XX

Example XVIII was repeated except that 0.5180 parts by weight of 2-ethylhexoic acid was added to 83 parts by weight of the hardener component. The mix ratio of polyepoxide to hardener component was 100 parts by weight of polyepoxide to 83.5180 parts by weight of hardener component.

EXAMPLE XXI

Example XVIII was repeated except that 0.9980 parts by weight of 2-ethylhexoic acid was added to 83 parts by weight of the hardener component. The mix ratio of polyepoxide to hardener component was 100 parts by weight of polyepoxide to 83.9980 parts by weight of hardener component.

EXAMPLE XXII

Example XVIII was repeated except that 1.5208 parts by weight of 2-ethylhexoic acid was added to 83 parts by weight of the hardener component. The mix ratio of polyepoxide to hardener component was 100 parts by weight of polyepoxide to 84.5208 parts by weight of hardener component.

The following data, summarized below, was obtained using the previously described procedures at 77° F. except where indicated otherwise.

| Example | Pot Life (Min.) | Thin Film Set Time (Min.) | P.R. | Time to Barcol 0 (Min.) | Time to Barcol 40 (Min.) | Barcol Hardness After 5 Days | Barcol Hardness After 5 days at 40° F. | Pot Life at 40° F. (Min.) | Thin Film Set Time at 40° F. (Min.) | P.R. at 40° F. |
|---|---|---|---|---|---|---|---|---|---|---|
| XVIII | 6.5 | 10.5 | 1.62 | 25 | 38 | 80 | 76 | 14.0 | 26.0 | 1.88 |
| XIX | 10.5 | 14.5 | 1.38 | 29 | 45 | 80 | 76 | 20.0 | 33.0 | 1.65 |
| XX | 15.0 | 19.0 | 1.27 | 37 | 50 | 80 | 76 | 35.5 | 49.5 | 1.39 |
| XXI | 22.5 | 26.0 | 1.16 | 49 | 60 | 79 | 76 | 54.5 | 63.5 | 1.17 |
| XXII | 32.0 | 35.0 | 1.09 | 62 | 71 | 80 | 74 | 78.0 | 78.0 | 1.00 |

Similar results were obtained with lauric acid, pelargonic acid, azelaic acid, isostearic acid, oleic acid, neodecanoic acid and naphthenic acids.

EXAMPLE XXIII

The polyepoxide and hardener component were the same as in Example XVIII. However 3.3 parts by weight of isostearic acid was added by simple mixing to the hardener component. The mix ratio of polyepoxide to hardener component was 100 parts by weight of polyepoxide to 86.3 parts by weight of hardener component which contained isostearic acid.

The following data summarized below was obtained using the previously described procedures at 77° F.

| Pot Life (Min.) | Thin Film Set (Min.) | P.R. | Time To Barcol 0 (Min.) | Time To Barcol 40 (Min.) | Barcol After 48 Hrs. |
|---|---|---|---|---|---|
| 34 | 38.5 | 1.12 | 66 | 82 | 75 |

EXAMPLE XXIV

The hardener component was composed of a blend of (a) 44.832 parts by weight of limonenedimercaptan, (b) 44.832 parts by weight of the polymercaptan of Example I (c) 2.491 parts by weight of 2-(N,N-dimethylamino) ethyl 3-(N,N-dimethylamino) n-propyl ether and (d) 7.472 parts by weight of 2,4,6-tri (dimethylaminomethyl) phenol and (e) 0.373 parts by weight of a perfumed deodorant (Veilex 05057 of Monsanto).

The polyepoxide was a blend of (a) 33 parts by weight of 2,2-bis [4-(2',3' epoxy, propoxy) phenyl] propane, (b) 45 parts by weight of epoxy novolac resin of Example I and (c) 22 parts by weight of neopentylglycoldiglycidyl ether. The mix ratio of polyepoxide to hardener was 100 parts by weight of polyepoxide to 81 parts by weight of hardener. The data below was obtained using the previously described procedures at 77° F.

| Pot Life (Min.) | Thin Film Set (Min.) | P.R. | Time To Barcol 0 (Min.) | Time To Barcol 40 (Min.) | Barcol After 5 Days |
|---|---|---|---|---|---|
| 6.0 | 11.0 | 1.8 | 16.5 | 26.0 | 85 |

EXAMPLE XXV

This example shows a mercaptan cured polyepoxide formulation containing fillers, thixatropes, flow and adhesion modifiers as well as an activator of this invention.

The polyepoxide resin is the same as disclosed in Example XXIV. Into 100 parts by weight of this resin, 5 parts by weight of titanium dioxide and 95 parts by weight of wollastonite (acidular calcium metasilicate) were dispersed using a standard high shear pigment mixer (Premier Dispersator). To this dispersion 0.1 parts by weight of a polyacrylate wetting agent (Modaflo supplied by Monsanto Industrial Chemicals Co.) and 2.0 parts by weight of high purity short-fiber chrysotile asbestos were blended in thoroughly.

The hardener component consisted of 80.9536 parts by weight of the polymercaptan hardener formulation described in Example XXIV blended with 0.5061 parts by weight of isostearic acid, 1.65 parts by weight of a mercapto silane coupling agent, (Union Carbide A-1893), 1.31 parts by weight of 2,4,6-tri (dimethylaminomethyl) phenol, 121.66 parts by weight of wollastonite which was dispersed into the system, 1.99 parts by weight of Thixatrol ST (a hydrogenated castor oil based thixatrope supplied by N. L. Industries, Inc.) which was dispersed with heat (140° F.) into the system and 0.03 parts by weight of carbon black also dispersed into the system.

The mix ratio was 1 part by weight of the hardener component to 0.9879 parts by weight of resin component. The following data was obtained using the previously described procedures. Testing was done at 77° F.

| | Pot Life (Min.) | Thin Film Set (Min.) | P.R. | Time To Barcol 0 (Min.) | Time To Barcol 40 (Min.) | 24 Hr. Barcol |
|---|---|---|---|---|---|---|
| Example XXV | 10 | 11 | 1.1 | 25 | 30 | 77 |

In order to demonstrate the unique effect of the ether groups contained in the tertiary amine ethers, similar structures comprising conventional commercial catalysts were compared at two temperatures. Each catalyst contained 30% by weight dipropylene glycol diluent for direct comparison with the commercial tertiary amine ether to which dipropylene glycol had been pre-added.

EXAMPLE XXVI

The epoxy resin used was that of Example I. The epoxy hardener was also that of Example I; however, 2.86 parts by weight of a 70/30 parts by weight blend of N,N,N',N'-tetramethyl-1,3-butane diamine and dipropylene glycol was used as the catalyst in place of 2-(N,N-dimethylamino) ethyl-3-(N,N-dimethylamino) n-propyl ether.

The mix ratio of epoxy resin to hardener was 100 parts by weight to 74.86 parts by weight respectively.

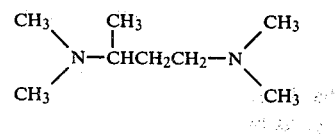

EXAMPLE XXVII

Example XXVI was repeated except that 2.86 parts by weight of a 70/30 parts by weight blend of N,N,N',N'-tetramethyl-1,3-diamino-2-propanol and dipropylene glycol was employed as the catalyst.

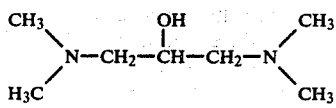

EXAMPLE XXVIII

Example XXVI was repeated except that the catalyst was 2.86 parts by weight of a 70/30 parts by weight blend of bis [2-(N,N-dimethylamino) ethyl] ether and dipropylene glycol.

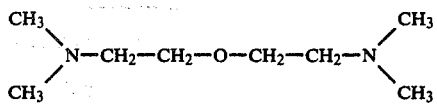

The following data, summarized below, was obtained using the previously described procedures.
Results at 77° F.:

|  | Pot Life (Min.) | Thin Film Set Time (Min.) | P.R. | Time to Barcol 0 (Min.) | Time to Barcol 40 (Min.) |
| --- | --- | --- | --- | --- | --- |
| Example XXVI | 9 | 12.0 | 1.3 | 48 | >150 |
| Example XXVII | 15 | 14.5 | 1.3 | 49 | >150 |
| Example XXVIII | 8 | 10.0 | 1.2 | 32 | 85 |

Results at 40° F.:

|  | Pot Life (Min.) | Thin Film Set Time (Min.) | P.R. | Time To Barcol 0 (Min.) | Time To Barcol 40 (Min.) |
| --- | --- | --- | --- | --- | --- |
| Example XXVI | 43.0 | 56.0 | 1.3 | 118 | >180 |
| Example XXVII | 57.5 | 65.5 | 1.1 | 129 | >180 |
| Example XXVIII | 44.0 | 47.0 | 1.1 | 86 | 140 |

In another example demonstrating the unique effect of the ether group contained in the tertiary amine ethers, a higher level of catalyst was employed and two tertiary amine ethers compared with the structurally similar N,N,N',N'-tetramethyl-1,3-butane diamine. 2,4,6 tri (dimethylaminomethyl) phenol was included for comparison.

EXAMPLE XXIX

The epoxy resin used was that of Example I. The hardener was that of Example I with 5 parts by weight of a 70/30 parts by weight blend of bis [2-(N,N-dimethylamino) ethyl] ether and dipropylene glycol used in place of the 2-(N,N-dimethylamino) ethyl-3-(N,N-dimethylamino) n-propyl ether as the catalyst. The mix ratio of epoxy resin to hardener was 100 parts by weight to 77 parts by weight.

EXAMPLE XXX

Example XXIX was repeated except that 3.5 parts by weight of 2-(N,N-dimethylamino) ethyl-3-(N,N-dimethylamino) n-propyl ether was added to the hardener as the sole catalyst. The mix ratio of epoxy resin to hardener was 100 parts by weight to 75.5 parts by weight.

EXAMPLE XXXI

Example XXIX was repeated except that 3.5 parts by weight of 2,4,6 tri (dimethylaminomethyl) phenol was added to the hardener as the sole catalyst. The mix ratio of epoxy resin to hardener was 100 parts by weight to 75.5 parts by weight.

EXAMPLE XXXII

Example XXIX was repeated except that 3.5 parts by weight of N,N,N',N'-tetramethyl-1,3-butane diamine was added to the hardener as the sole catalyst. The mix ratio of epoxy resin to hardener was 100 parts by weight epoxy resin to 75.5 parts by weight hardener.

The following data, summarized, below, was obtained using the previously described procedures.
Results at 77° F.:

|  | Pot Life (Min.) | Thin Film Set Time (Min.) | P.R. | Time To Barcol 0 (Min.) | Time To Barcol 40 (Min.) |
| --- | --- | --- | --- | --- | --- |
| Example XXIX | 6.5 | 9.0 | 1.4 | 11.0 | 20.0 |
| Example XXX | 6.5 | 9.5 | 1.5 | 11.0 | 18.0 |
| Example XXXI | 18.0 | 21.5 | 1.2 | 30.0 | 52.0 |
| Example XXXII | 6.5 | 10.0 | 1.5 | 26.0 | >100 |

Examples XXXIII and XXXIV demonstrate the effect of storage upon the tertiary amine ether in combination with polymercaptan in the absence of polyepoxide resin. As shown by the data, ageing had no deleterious effect upon the hardener composition containing tertiary amine ether as catalyst.

EXAMPLE XXXIII

The hardener composition was a simple blend of 36 parts by weight of the polymercaptan based on a propylene oxide derivative of pentaerythritol as described in Example I, 36 parts by weight of limonene dimercaptan and 3.5 parts by weight of 2-(N,N-dimethylamino) ethyl 3-(N,N-dimethylamino) n-propyl ether.

EXAMPLE XXXIV

The hardener composition was the same as in Example XXXIII except that the catalyst was 5 parts by weight of a 70/30 parts by weight blend of bis (2-dimethylamino ethyl) ether and dipropylene glycol.

Testing for Examples XXXIII and XXXIV was conducted as follows: The hardener compositions of the above two examples were each placed in separate closed one pint lined paint cans, approximately half filled. The cans containing the hardener compositions were placed in an air-circulated electric oven maintained at 140° F. for two weeks. After two weeks at 140° F., the cans were removed from the oven and the caps opened to introduce fresh oxygen (air) into the air space within each can. The cans were then closed, replaced in the oven and maintained at 140° F. for an additional two weeks. After a total of four weeks at 140° F., the cans containing the hardener compositions were removed from the oven and held at ambient temperature (about 77° F.) for an additional four weeks.

Testing of the hardener compositions in admixture with unaged polyepoxide resin was performed upon samples before and after the above described ageing procedure. Changes in viscosity, appearance and reactivity were measured. The polyepoxide resin was the same as that described in Example I. Mix ratios for the pot life, thin film set time, time to Barcol 0 and time to Barcol 40 were as follows: 75.5 parts by weight of the hardener composition of Example XXXIII was added to 100 parts by weight of the polyepoxide resin and 77.0 parts by weight of the hardener composition of Example XXXIV was added to 100 parts by weight of the polyepoxide resin.

The following data, summarized below, was obtained using the previously described procedures at 77° F.

| Pot Life (Min.) | Thin Film Set Time (Min.) | P.R. | Time To Barcol 0 (Min.) | Time To Barcol 40 (Min.) |
| --- | --- | --- | --- | --- |
| 8 | 11 | 1.37 | 15 | 19 |

While the invention has been described with reference to certain specific embodiments thereof, it is understood that it is not to be so limited since alterations and changes may be made therein which are within the full intended scope of the appended claims.

| | INITIAL RESULTS | | | | | | RESULTS AFTER AGEING | | | | | | |
| --- | --- | --- | --- | --- | --- | --- | --- | --- | --- | --- | --- | --- | --- |
| | Visc.* (Poise) | Pot Life (Min.) | Thin Film Set Time (Min.) | P.R. | Time To Barcol 0 (Min.) | Time To Barcol 40 (Min.) | Appearance | Visc.* (Poise) | Pot Life (Min.) | Thin Film Set Time (Min.) | P.R. | Time To Barcol 0 (Min.) | Time To Barcol 40 (Min.) | Appearance |
| Ex. XXXIII | 1.75 | 5.5 | 7.5 | 1.36 | 19 | 38 | Amber- slight lighter than Example XXXIV | 1.90 | 5.5 | 7.5 | 1.36 | 21 | 42 | Very slight yellowing. No separation or skin formation |
| Ex. XXXIV | 1.70 | 6.0 | 8.0 | 1.33 | 20 | 46 | Amber | 1.90 | 6.0 | 7.0 | 1.40 | 22 | 53 | Very slight yellowing. No separation or skin formation |

*Brookfield Viscometer was used in test.

EXAMPLE XXXV

Example I was repeated except that 3.5 parts by weight of bis (2-dimethylaminoethyl) formal was used as the catalyst in the hardener composition.

EXAMPLE XXXVI

Example XXXV was repeated except that 6.0 parts by weight of catalyst was present in the hardener composition.

EXAMPLE XXXVII

Example XXXV was repeated except that 10 parts by weight of catalyst was present in the hardener composition.

The following data, summarized below, was obtained using the previously described procedures at 77° F.:

| | Pot Life (Min.) | Thin Film Set Time (Min.) | P.R. | Time To Barcol 0 (Min.) | Time To Barcol 40 (Min.) |
| --- | --- | --- | --- | --- | --- |
| Ex. XXXV | 13 | 17 | 1.3 | 29 | 194 |
| Ex. XXXVI | 7 | 10 | 1.4 | 14 | 26 |
| Ex. XXXVII | 5 | 6 | 1.2 | 12 | 17 |

EXAMPLE XXXVII

Example XXIV was repeated except that the catalyst was replaced with bis (2-dimethylaminoethyl) formal.

The following data, summarized below, was obtained using the previously described procedures at 77° F.:

What is claimed is:

1. A curing system for curing polyepoxides comprising:
   (a) at least one polymercaptan, and
   (b) at least one catalyst which is poly[(N,N-dimethylamino) alkyl] ether containing two, three or four N,N-dimethylaminoalkyl substituents of the formula

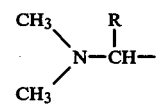

where R represents hydrogen or straight or branched chain alkyl radicals having from 1 to 10 carbon atoms and in any one compound R can be the same or different and with the proviso that the dimethylamino groups are one, two or three carbon atoms removed from ether oxygen.

2. A curing system for curing polyepoxides comprising:
   (a) at least one polymercaptan, and
   (b) at least one catalyst which is poly[(N,N-dimethylamino) alkyl] ether having the formula

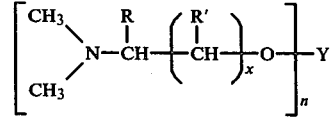

where R represents hydrogen or straight or branched chain alkyl radicals having from 1 to 10 carbon atoms, R' is the same as R, is dimethylaminomethyl or dimethylaminoethyl, x is 0, 1 or 2, n is 1, 2, 3 or 4 with the proviso that in any one catalyst there are two, three or four dimethylaminoalkyl groups
and in any one compound R can be the same or different and R' can be the same or different and in any one compound x can be the same or different and Y is aliphatic, substituted aliphatic, heterocyclic, alicyclic or aromatic and with the proviso that when n is 1, Y is

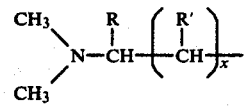

where R and R' and x are same as above.

3. A curing system for curing polyepoxides comprising:
(a) at least one polymercaptan, and
(b) at least one catalyst having the formula

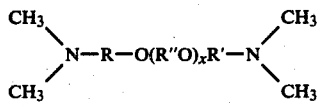

where R, R' and R" represent methylene, ethylene, n-propylene, iso-propylene or iso-butylene and in any one compound R, R' and R" can be the same or different and x is 0 or 1.

4. The curing system of claim 3 wherein there is from about 0.1 to about 1.5 equivalents of said polymercaptan per epoxide equivalent, from about 0.1 to about 20.0 parts by weight of said catalyst per 100 parts by weight of polyepoxide and from 0 to about 20.0 parts by weight of at least one co-catalyst of the group consisting of organic sulfide, tertiary phosphine and tertiary amine having no bridged atoms, having no ether oxygen and having at least one tertiary amine group per 100 parts by weight of polyepoxide.

5. The curing system of claim 4 wherein said catalyst is 2-(N,N-dimethylamino) ethyl 3-(N,N-dimethylamino) n-propyl ether.

6. The curing system of claim 4 wherein said catalyst is bis [2-(N,N-dimethylamino) ethyl] ether.

7. The curing system of claim 4 wherein said co-catalyst is 2,4,6-tri (dimethylaminomethyl) phenol.

8. The curing system of claim 4 wherein there is present at least one organic compound having at least one acidic group and having a pKa greater than about 3.5, the ratio of acidic group to tertiary nitrogen in said catalyst being from about 0.005:1 to about 1:1.

9. The curing system of claim 8 wherein said organic compound is selected from the group consisting of isostearic acid, oleic acid and naphthenic acids.

10. A curable epoxy resin composition comprising:
(a) at least one polyepoxide,
(b) at least one polymercaptan, and
(c) at least one catalyst which is poly [ (N,N-dimethylamino) alkyl] ether containing two, three or four N,N-dimethylaminoalkyl substituents of the formula

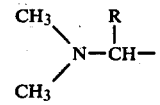

where R represents hydrogen or straight or branched chain alkyl radicals having from 1 to 10 carbon atoms and in any one compound R can be the same or different and with the proviso that the dimethylamino groups are one, two or three carbon atoms removed from ether oxygen.

11. A curable epoxy resin composition comprising:
(a) at least one polyepoxide,
(b) at least one polymercaptan, and
(c) at least one catalyst which is poly [(N,N-dimethylamino) alkyl] ether having the formula

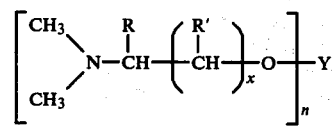

where R represents hydrogen or straight or branched chain alkyl radicals having from 1 to 10 carbon atoms, R' is the same as R, is dimethylaminomethyl or dimethylaminoethyl, x is 0, 1 or 2, n is 1, 2, 3 or 4 with the proviso that in any one catalyst there are two, three or four dimethylaminoalkyl groups
and in any one compound R can be the same or different and R' can be the same or different and in any one compound x can be the same or different and Y is aliphatic, substituted aliphatic, heterocyclic, alicyclic or aromatic and with the proviso that when n is 1, Y is

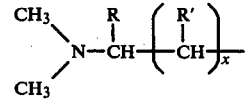

where R and R' and x are the same as above.

12. A curable epoxy resin composition comprising:
(a) at least one polyepoxide,
(b) at least one polymercaptan, and
(c) at least one catalyst having the formula

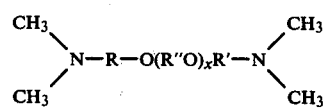

where R, R' and R" represent methylene, ethylene, n-propylene, iso-propylene or iso-butylene and in any one compound R, R' and R" can be the same or different and x is 0 or 1.

13. The curable epoxy resin composition of claim 12 wherein there is present
(a) from about 0.1 to about 1.5 equivalents of said polymercaptan per epoxide equivalent,
(b) from about 0.1 to about 20.0 parts by weight of said catalyst per 100 parts by weight of polyepoxide, (c) from 0 to about 20.0 parts by weight of at least one co-catalyst of the group consisting of organic sulfide, tertiary phosphine and tertiary amine having no bridged atoms, having no ether oxygen and having at least one tertiary amine group per 100 parts by weight of polyepoxide.

14. The composition of claim 13 wherein said catalyst is 2-(N,N-dimethylamino) ethyl 3-(N,N-dimethylamino) n-propyl ether.

15. The composition of claim 13 wherein said catalyst is bis [2-(N,N-dimethylamino) ethyl] ether.

16. The composition of claim 13 wherein said co-catalyst is 2,4,6-tri (dimethylaminomethyl) phenol.

17. The composition of claim 13 wherein there is present at least one organic compound having at least one acidic group and having a pKa greater than about 3.5, the ratio of acidic group to tertiary nitrogen in said catalyst being from about 0.005:1 to about 1:1.

18. The composition of claim 17 wherein said organic compound is selected from the group consisting of isostearic acid, oleic acid and naphthenic acids.

19. A substantially insoluble and infusible product which is the reaction product of a polyepoxide composition comprising:
(a) at least one polyepoxide,
(b) at least one polymercaptan, and
(c) at least one catalyst which is poly [(N,N-dimethylamino) alkyl] ether containing two, three or four N,N-dimethylaminoalkyl substituents of the formula

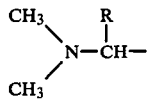

where R represents hydrogen or straight or branched chain alkyl radicals having from 1 to 10 carbon atoms and in any one compound R can be the same or different and with the proviso that the dimethylamino groups are one, two or three carbon atoms removed from ether oxygen.

20. A substantially insoluble and infusible product which is the reaction product of a polyepoxide composition comprising:
(a) at least one polyepoxide,
(b) at least one polymercaptan, and
(c) at least one catalyst which is poly [(N,N-dimethylamino) alkyl] ether containing two, three or four N,N-dimethylaminoalkyl ether substituents of the formula

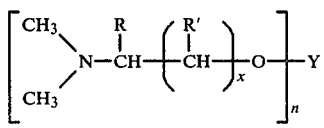

where R represent hydrogen or straight or branched chain alkyl radicals having from 1 to 10 carbon atoms, R' is the same as R, is dimethylaminomethyl or dimethylaminoethyl, x is 0, 1 or 2, n is 1, 2, 3 or 4 with the proviso that in any one catalyst there are two, three or four dimethylaminoalkyl groups.
and in any one compound R can be the same or different and R' can be the same or different and in any one compound x can be the same or different and Y is aliphatic, substituted aliphatic, heterocyclic, alicyclic or aromatic and with the proviso that when n is 1, Y is

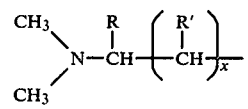

where R and R' and x are the same as above.

21. A substantially insoluble and infusible product which is the reaction product of a polyepoxide composition comprising:
(a) at least one polyepoxide,
(b) at least one polymercaptan, and
(c) at least one catalyst having the formula

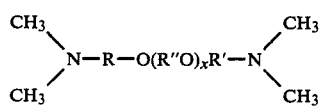

where R, R' and R" represent methylene, ethylene, n-propylene, iso-propylene or iso-butylene and in any one compound R, R' and R" can be the same or different and x is 0 or 1.

22. The composition of claim 21 wherein there is from about 0.1 to about 1.5 equivalents of said polymercaptan per epoxide equivalent, from about 0.1 to about 20.0 parts by weight of said catalyst per 100 parts by weight of polyepoxide, from 0 to about 20.0 parts by weight of at least one co-catalyst of the group consisting of organic sulfide, tertiary phosphine and tertiary amine having no bridged atoms, having no ether oxygen and having at least one tertiary amine group per 100 parts by weight of polyepoxide.

23. The composition of claim 22 wherein said catalyst is 2-(N,N-dimethylamino) ethyl 3-(N,N-dimethylamino) n-propyl ether.

24. The composition of claim 22 wherein said catalyst is bis [2-(N,N-dimethylamino) ethyl] ether.

25. The composition of claim 22 wherein said co-catalyst is 2,4,6-tri (dimethylaminomethyl) phenol.

26. The composition of claim 22 wherein there is present at least one organic compound having at least one acidic group and having a pKa greater than about 3.5, the ratio of acidic group to tertiary nitrogen in said catalyst being from about 0.005:1 to about 1:1.

27. The composition of claim 26 wherein said organic compound is selected from the group consisting of isostearic acid, oleic acid and naphthenic acids.

28. A process for curing polyepoxide comprising mixing together and reacting at least one polyepoxide with a curing system comprising:
(a) at least one polymercaptan, and
(b) at least one catalyst which is poly [(N,N-dimethylamino) alkyl] ether having two, three or four N,N-dimethylaminoalkyl substituents of the formula

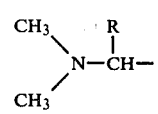

where R represents hydrogen or straight or branched chain alkyl radicals having from 1 to 10 carbon atoms and in any one compound R can be the same or different and with the proviso that the dimethylamino groups are one, two or three carbon atoms removed from ether oxygen.

29. A process for curing polyepoxide comprising mixing together and reacting at least one polyepoxide with a curing system comprising:
   (a) at least one polymercaptan, and
   (b) at least one catalyst which is poly [(N,N-dimethylamino) alkyl] ether having the formula $$\left[\begin{array}{c}CH_3\\ \diagdown\\ CH_3\end{array}\!\!N\!-\!\overset{R}{\underset{|}{CH}}\!-\!\!\left(\overset{R'}{\underset{|}{CH}}\right)_{\!x}\!\!-\!O\right]_{\!n}\!\!-\!Y$$

where R represents hydrogen or straight or branched chain alkyl radicals having from 1 to 10 carbon atoms, R' is the same as R, is dimethylaminomethyl or dimethylaminoethyl, x is 0, 1 or 2, n is 1, 2, 3 or 4 with the proviso that in any catalyst there are two, three or four dimethylaminoalkyl groups and in any one compound R can be the same or different and R' can be the same or different and in any one compound x can be the same or different and Y is aliphatic, substituted aliphatic, heterocyclic, alicyclic or aromatic and with the proviso that when n is 1, Y is $$\begin{array}{c}CH_3\\ \diagdown\\ CH_3\end{array}\!\!N\!-\!\overset{R}{\underset{|}{CH}}\!-\!\!\left(\overset{R'}{\underset{|}{CH}}\right)_{\!x}\!\!-$$

where R and R' and x are the same as above.

30. A process for curing polyepoxide comprising mixing together and reacting said polyepoxide with a curing system comprising:
   (a) at least one polymercaptan, and
   (b) at least one catalyst having the formula $$\begin{array}{c}CH_3\\ \diagdown\\ CH_3\end{array}\!\!N\!-\!R\!-\!O(R''O)_xR'\!-\!N\!\!\begin{array}{c}\diagup CH_3\\ \diagdown CH_3\end{array}$$

where R, R' and R" represent methylene, ethylene, n-propylene, iso-propylene or iso-butylene and in any one compound R, R' and R" can be the same or different and x is 0 or 1.

31. The process of claim 30 wherein there is from about 0.1 to about 1.5 equivalents of said polymercaptan per epoxide equivalent, from about 0.1 to about 20.0 parts by weight of said catalyst per 100 parts by weight of polyepoxide, from 0 to about 20 parts by weight of at least one co-catalyst of the group consisting of organic sulfide, tertiary phosphine and tertiary amine having no bridged atoms, having no ether oxygen and having at least one tertiary amine group per 100 parts by weight of polyepoxide.

32. The process of claim 31 wherein said catalyst is 2-(N,N-dimethylamino) ethyl 3-(N,N-dimethylamino) n-propyl ether.

33. The process of claim 31 wherein said catalyst is bis [2-(N,N-dimethylamino) ethyl] ether.

34. The process of claim 31 wherein said co-catalyst is 2,4,6-tri (dimethylaminomethyl) phenol.

35. The process of claim 31 wherein there is present at least one organic compound having at least one acidic group and having a pKa greater than about 3.5, the ratio of acidic group to tertiary nitrogen in said catalyst being from about 0.005:1 to about 1:1.

36. The process of claim 35 wherein said organic compound is selected from the group consisting of isostearic acid, oleic acid and naphthenic acids.

* * * * *